United States Patent
Ohta (10) Patent No.: US 9,036,221 B2
(45) Date of Patent: May 19, 2015

(54) SHEET FEEDING APPARATUS (71) Applicant: Masahiko Ohta, Nagoya (JP)

(72) Inventor: Masahiko Ohta, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/169,170

(22) Filed: Jan. 31, 2014

(65) Prior Publication Data

US 2014/0211274 A1    Jul. 31, 2014

(30) Foreign Application Priority Data

Jan. 31, 2013   (JP) ................................. 2013-016809

(51) Int. Cl.
| | |
|---|---|
| *H04N 1/04* | (2006.01) |
| *H04N 1/12* | (2006.01) |
| *H04N 1/00* | (2006.01) |
| *B65H 31/02* | (2006.01) |
| *B65H 1/06* | (2006.01) |
| *H04N 1/193* | (2006.01) |

(52) U.S. Cl.
CPC ................ *H04N 1/12* (2013.01); *H04N 1/193* (2013.01); *H04N 1/00519* (2013.01); *H04N 2201/0081* (2013.01); *B65H 31/02* (2013.01); *B65H 1/06* (2013.01); *B65H 2405/1111* (2013.01); *B65H 2405/11151* (2013.01); *B65H 2405/3322* (2013.01)

(58) Field of Classification Search
USPC .................... 358/482, 498, 474, 497
See application file for complete search history.

(56) References Cited

U.S. PATENT DOCUMENTS

| | | | |
|---|---|---|---|
| 6,547,288 B1 | 4/2003 | Ito et al. | |
| 7,414,764 B2 | 8/2008 | Shyu | |
| 7,528,973 B2 | 5/2009 | Enomoto et al. | |
| 7,604,228 B2 | 10/2009 | Ohama et al. | |
| 7,692,824 B2 | 4/2010 | Shirai | |
| 7,694,959 B2 | 4/2010 | Shimazu et al. | |
| 7,924,475 B2 | 4/2011 | Suzuki | |
| 8,210,515 B2 | 7/2012 | Nishizawa et al. | |
| 8,237,959 B2 | 8/2012 | Kato | |
| 8,267,397 B2 | 9/2012 | Shimazu et al. | |
| 8,508,817 B2 | 8/2013 | Sato | |
| 8,508,819 B2 | 8/2013 | Asada et al. | |

(Continued)

FOREIGN PATENT DOCUMENTS

| | | |
|---|---|---|
| JP | 11-079418 A | 3/1999 |
| JP | 11-227992 A | 8/1999 |

(Continued)

OTHER PUBLICATIONS

Co-Pending U.S. Appl. No. 14/169,172, filed Jan. 31, 2014.

(Continued)

*Primary Examiner* — Houshang Safaipour
(74) *Attorney, Agent, or Firm* — Banner & Witcoff, Ltd.

(57) ABSTRACT

A sheet feeding apparatus includes a first tray, a frame member, and a feeder. The frame member includes a first wall portion facing in a width direction and a first tray portion disposed above the first tray and extending inward in the width direction from the first wall portion. The first tray has a first end on a side far from the feeder. The first tray portion of the frame member has a second end on the side far from the feeder and a third end on a side near the feeder. The second end is closer to the feeder than the first end. The first wall portion extends from the third end toward the first end.

16 Claims, 10 Drawing Sheets

(56) References Cited

U.S. PATENT DOCUMENTS

| | | | |
|---|---|---|---|
| 8,727,333 | B2 | 5/2014 | Ohmiya |
| 8,830,488 | B2 | 9/2014 | Iguchi et al. |
| 2002/0056957 | A1* | 5/2002 | Sekine ................... 271/3.14 |
| 2005/0212195 | A1 | 9/2005 | Ohama et al. |
| 2008/0048389 | A1 | 2/2008 | Shimazu et al. |
| 2010/0148427 | A1 | 6/2010 | Shimazu et al. |
| 2012/0155941 | A1 | 6/2012 | Kozaki et al. |

FOREIGN PATENT DOCUMENTS

| | | | |
|---|---|---|---|
| JP | 2000-351451 A | 12/2000 |
| JP | 2005-047687 A | 2/2005 |
| JP | 2005-247575 A | 9/2005 |
| JP | 2008-011541 A | 1/2008 |
| JP | 2008-063143 A | 3/2008 |
| JP | 2010-275051 A | 12/2010 |
| JP | 2012-126530 A | 7/2012 |
| JP | 2012-197168 A | 10/2012 |
| JP | 2012-206852 A | 10/2012 |

OTHER PUBLICATIONS

Aug. 25, 2014—(US) Non-Final Office Action—U.S. Appl. No. 14/169,172.

Dec. 24, 2014—(US) Notice of Allowance—U.S. Appl. No. 14/169,172.

* cited by examiner

SHEET FEEDING APPARATUS

CROSS REFERENCE TO RELATED APPLICATION

This application claims priority from Japanese Patent Application No. 2013-016809, filed on Jan. 31, 2013, which is incorporated herein by reference in its entirety.

TECHNICAL FIELD

Aspects of the disclosure relate to a sheet feeding apparatus.

BACKGROUND

A known sheet feeding apparatus includes a document tray and an ejection tray disposed above the document tray. The ejection tray includes a pair of partition plates, which are movable with respect to the document tray in a width direction. The partition plates are integrally formed with document guides, respectively, which prevent a sheet being fed from the document tray from skewing.

The document tray and the ejection tray are configured to support a plurality of sheets. These trays are required to possess adequate rigidity to support sheets.

SUMMARY

Illustrative aspects of the disclosure provide a sheet feeding apparatus including an upper tray and a lower tray arranged vertically and configured to provide adequate rigidity in the upper tray.

According to an aspect of the disclosure, a sheet feeding apparatus includes a first tray, a frame member, and a feeder. The first tray is configured to support a stack of sheets. The frame member includes a first wall portion facing in a width direction and a first tray portion disposed above the first tray and configured to support a stack of sheets. The first tray portion extends inward in the width direction from the first wall portion. The feeder is configured to feed a sheet supported in the first tray to the first tray portion of the frame member in a feed direction perpendicular to the width direction. The first tray has a first end on a side far from the feeder. The first tray portion of the frame member has a second end on the side far from the feeder and a third end on a side near the feeder. The second end of the first tray portion of the frame member is located closer to the feeder than the first end of the first tray. The first wall portion extends from the third end of the first tray portion of the frame member toward the first end of the first tray.

This structure provides adequate rigidity in the first tray portion.

According to another aspect of the disclosure, a sheet feeding apparatus includes a first tray, a frame member, and a feeder. The first tray is configured to support a stack of sheets. The frame member includes a first wall portion facing in a width direction and a first tray portion disposed above the first tray and configured to support a stack of sheets. The first tray portion extends inward in the width direction from the first wall portion. The feeder is configured to feed a sheet between the first tray and the first tray portion of the frame member in a feed direction perpendicular to the width direction. The first tray has a first end on a side far from the feeder. The first tray portion of the frame member has a second end on the side far from the feeder and a third end on a side near the feeder. The second end of the first tray portion of the frame member is located closer to the feeder than the first end of the first tray. The first wall portion extends from the third end of the first tray portion of the frame member toward the first end of the first tray.

This structure provides adequate rigidity in the first tray portion.

BRIEF DESCRIPTION OF THE DRAWINGS

Illustrative aspects will be described in detail with reference to the following figures in which like elements are labeled with like numbers and in which.

DETAILED DESCRIPTION

The following description is directed to an illustrative embodiment of the disclosure. The scope of the disclosure, including the claims, is not limited to the embodiment. An image forming apparatus to which a sheet feeding apparatus according to illustrative aspects of the disclosure is applied will be described with reference to accompanying drawings.

Arrows indicating directions in each drawing are indicated to facilitate the understanding of positional relationships among components. For portions or components with numerals, at least one is provided unless "plural" or "two or more" is specifically stated otherwise.

Figure 1:
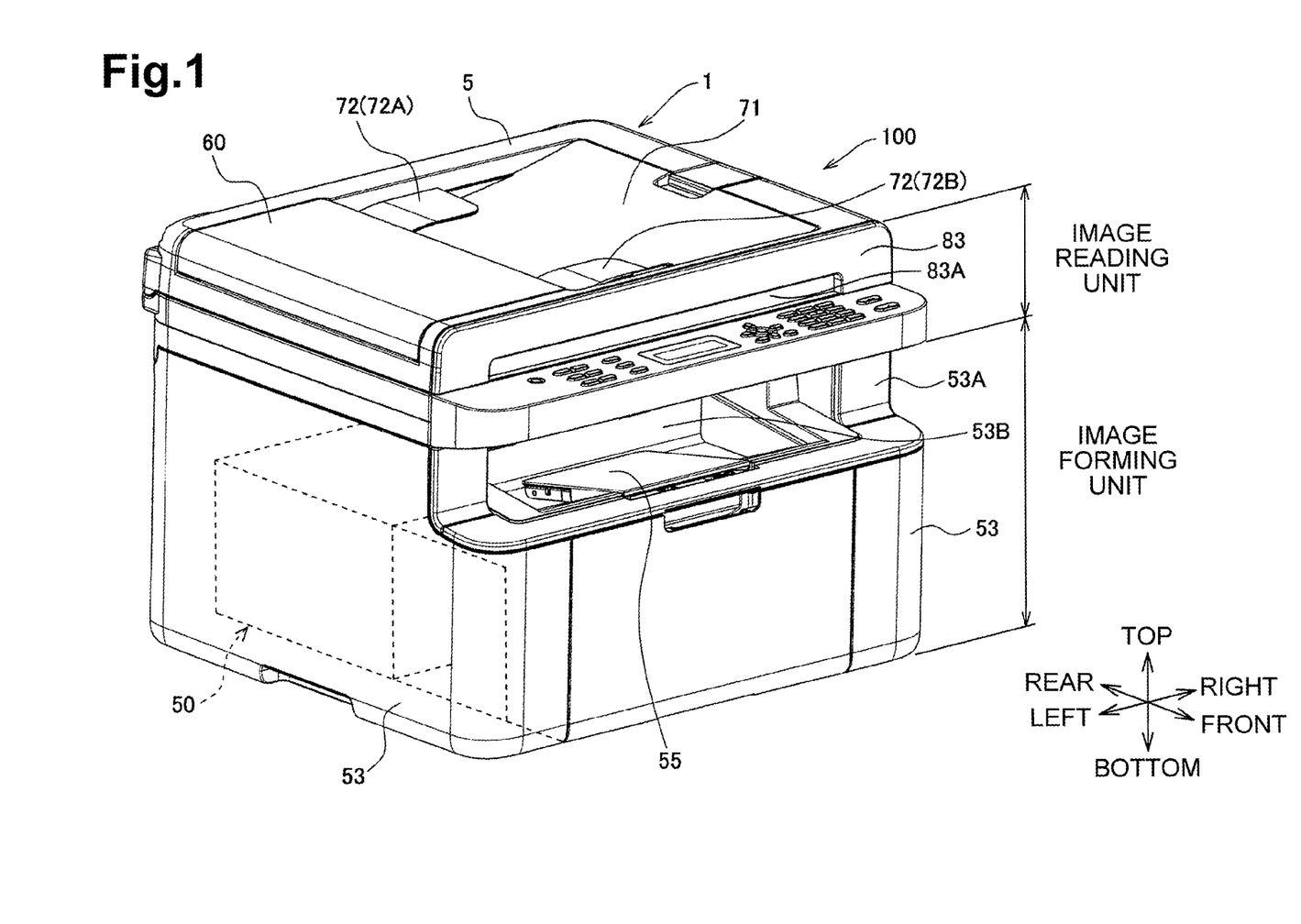
FIG. 1 is a perspective view of an illustrative image forming apparatus according to an embodiment of the disclosure.

As shown in FIG. 1, an image forming apparatus 100 includes an image reading apparatus 1 and an image forming portion 50 The image forming portion 50 is accommodated in a casing 53. An upper portion of the casing 53 contains a joint cover 53A connecting the image reading apparatus 1 and the image forming portion 50 via a space 53B.

The image forming portion 50 is configured to form an image on a sheet. The sheet having the image formed at the image forming portion 50 is ejected through the space 53B onto an ejection tray 55 disposed on an upper surface of the casing 53. The image forming portion 50 is of an electrophotographic type configured to form an image directly on a sheet by transferring a developer agent to the sheet.

The image reading apparatus 1 combines a document feeder reading function and a stationary document reading function. The document feeder reading function refers to a function to read a document being fed. The stationary document reading function refers to a function to read a document supported on a supporting surface 3A of a document table 3 shown in FIG. 2.

Figure 2:
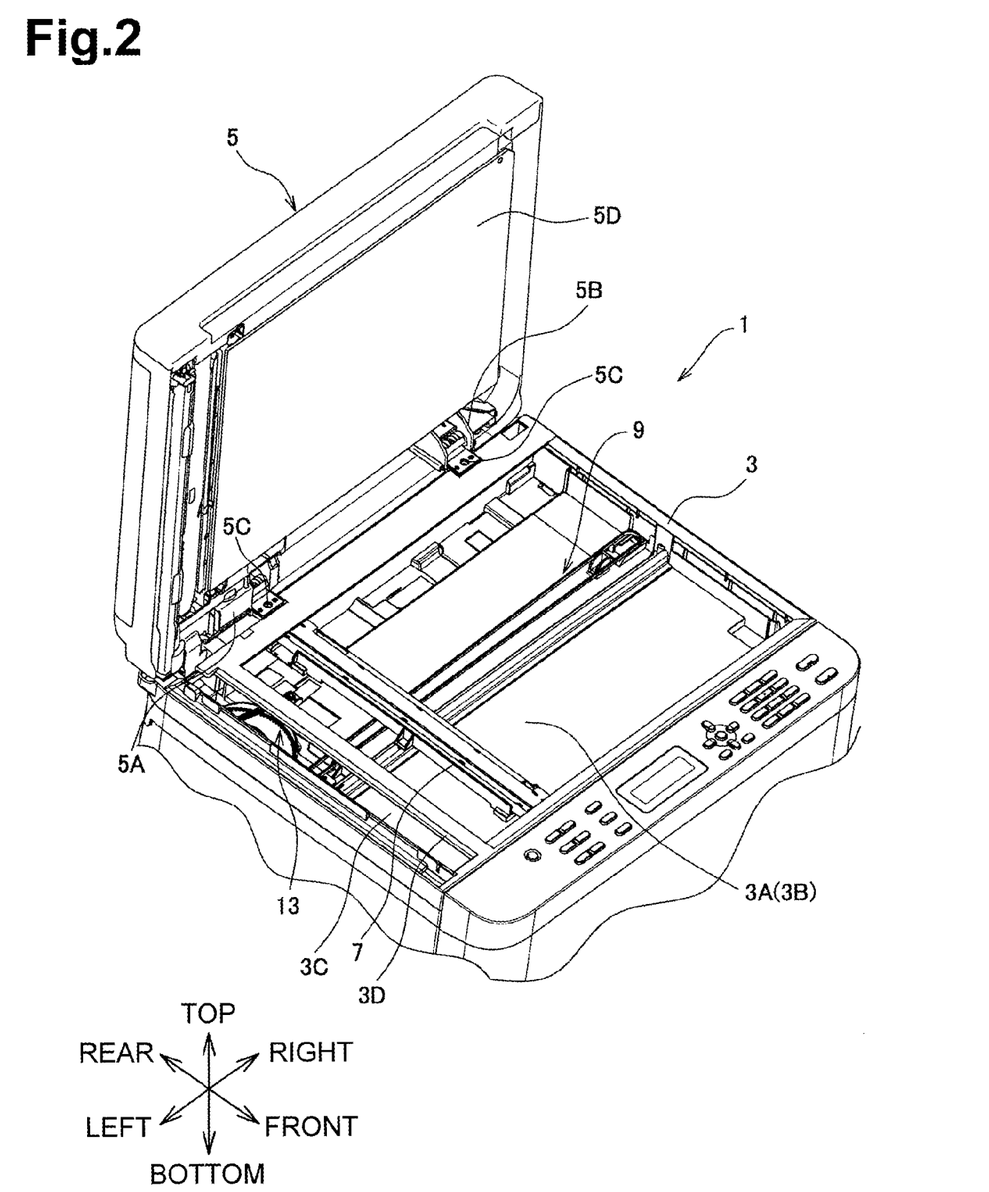
FIG. 2 is a perspective view of the image forming apparatus with a document cover being open according to the embodiment of the disclosure.

The receiving surface 3A of the document table 3 contains a first reading window 3B closed by a transparent platen made of such as a clear glass or clear acrylic board. A document cover 5 is attached to the document table 3 via hinge mechanisms 5A and 5B.

The hinge mechanisms 5A and 5B are fixed to the document table 3 using screws 5C. The document cover 5 is movable between a covering position shown in FIG. 1 where the document cover 5 covers the document table 3 and a position shown in FIG. 2 where the document cover 5 is spaced apart from the document table 3. The document cover 5 includes a first document presser 5D. The first document presser 5D faces the first reading window 3B when the document cover 5 covers the document table 3. When the stationary reading function is used, a user opens the document cover 5 upward and places a document to be read on the receiving surface 3A.

An image sensor 7 is disposed under the receiving surface 3A and configured to move along the receiving surface 3A. The image sensor 7 is configured to receive light projected to and then reflected from the document and emit electrical signals based on the light. While the stationary reading function is performed, the image sensor 7 is configured to read an image through the first reading window 3B while moving along the receiving surface 3A. The image reading apparatus 1 is configured to read an image of a document via the image sensor 7 by converting the image such as letters into electrical signal.

In the embodiment, a contact image sensor, CIS, is used as the image sensor 7. The CIS extends under the receiving surface 3A in a direction perpendicular to a moving direction where the CIS moves.

The image sensor 7 is attached to the document table 3 such that it is movable in a direction of the length of the receiving surface 3A. A moving mechanism 9 is configured to cause the image sensor 7 to move between a first position set on one end in the moving direction of the image sensor 7 and a second position set on the other end in the moving direction of the image sensor 7.

In the embodiment, the direction of the length of the receiving surface 3A corresponds to a left-right direction of the image reading apparatus 1. The first position is on the left end in the moving direction of the image sensor 7. The second position is on the right end in the moving direction.

When the document feeder reading function is performed, the image sensor 7 is stopped under a second reading window 3C to read an image of the document being fed to the second reading window 3C. When the stationary document reading function is performed, the image sensor 7 is configured to move under the receiving surface 3A to read an image of the document supported on the supporting surface 3A.

The second reading window 3C is closed by a transparent platen made of such as a clear glass as is the case with the first reading window or the receiving surface 3A. The receiving surface 3A and the second reading window 3C are partitioned by a beam 3D. The document cover 5 includes a second document presser 5E. The second document presser 5E faces the second reading window 3C when the document cover 5 covers the document table 3.

Figure 3:
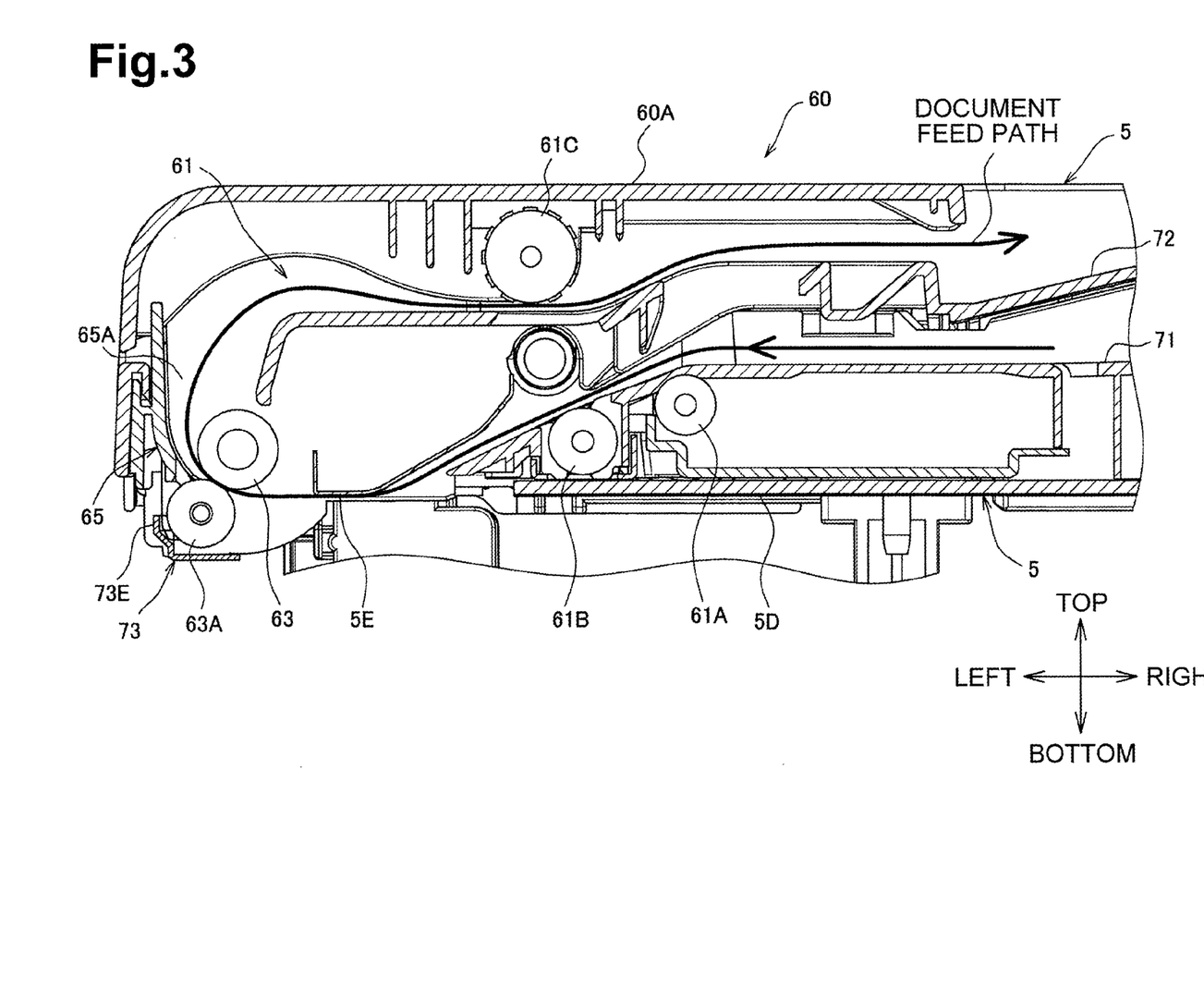
FIG. 3 is a sectional view of a feeding portion according to the embodiment of the disclosure.

As shown in FIG. 3, the document cover 5 includes a feeding mechanism 60 to which the disclosure applies. The feeding mechanism 60 is an example of an automatic document feeder configured to feed a document to the second reading window 3C when the document feeder reading function is performed.

In the embodiment, the moving mechanism 9 and the feeding mechanism 60 are driven by one drive source such as an electric motor. That is, a transmission mechanism transmits a drive force generated by the drive source selectively to the moving mechanism 9 or the feeding mechanism 60. The transmission mechanism and the drive source, which are not shown, are disposed under the receiving surface 3A of the document table 3.

The feeding mechanism 60 includes a first tray 71, a second tray 72, and a feeding portion 61. The first tray 71 corresponds to a document tray, and the second tray 72 corresponds to an ejection tray.

The feeding portion 61 is configured to feed documents one by one from the first tray 71 toward the second reading window 3C and to sequentially eject the documents to the second tray 72.

The feeding portion 61 is disposed downstream from the first tray 71 in a feed direction where a document is fed. The first tray 71 is adjacent to an inlet of the feeding portion 61. The second tray 72 is adjacent to an outlet of the feeding portion 61.

The feeding portion 61 includes a pickup roller 61A, a separation roller 61B, a separation pad (not shown) disposed on the separation roller 61B, a feed roller 63, and an ejection roller 61C. The pickup roller 61A is configured to pick a few documents from a stack of documents supported in the first tray 71 and feed the documents toward the separation roller 61B.

The separation roller 61B and the separation pad are configured to operate together to separate individual documents sequentially from a lowermost document of the documents lying on top of each other and feed a document at a time toward the second reading window 3C. The feed roller 63 is configured to rotate in contact with the document passing the second reading window 3C.

The feed direction of the document, which receives a feeding force from the feed roller 63, is turned around at a guide member 65, and the document is fed toward the second tray 72 by the ejection roller 61C. A following document fed from the first tray 71 is supported in the second tray 72 under a preceding document already supported in the second tray 72. The guide member 65 is configured to guide a document being fed and function as a feed chute defining a feed path 65A in which a document is fed.

A pinch roller 63A is disposed facing the feed roller 63. The pinch roller 63A is configured to press the document being fed toward the feed roller 63. The pinch roller 63A is supported such that it is movable in a direction close to or apart from the feed roller 63. The direction close to or apart from the feed roller 63 corresponds to a direction substantially parallel to a direction perpendicular to both an axis of the feed roller 63 and an axis of the pinch roller 63A.

Figure 4:
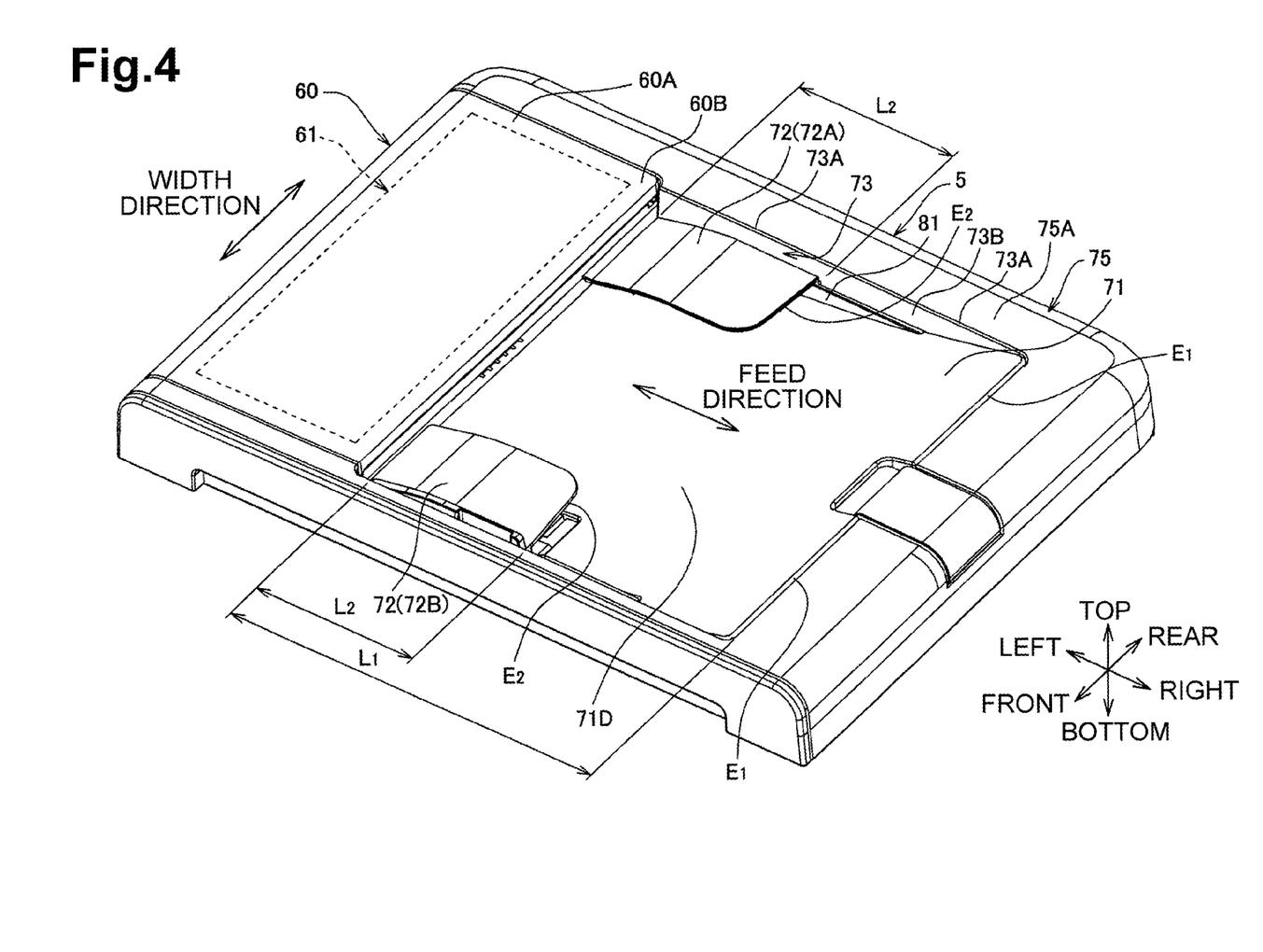
FIG. 4 is an external perspective view of an image reading apparatus according to the embodiment of the disclosure.

The first tray 71 and the second tray 72 are configured to support sheets, e.g. documents. As shown in FIG. 4, the second tray 72 is disposed above the first tray 71 via a space of a specified dimension. The specified dimension is determined based on the maximum number of sheets to be supported in the first tray 71.

Figure 5:
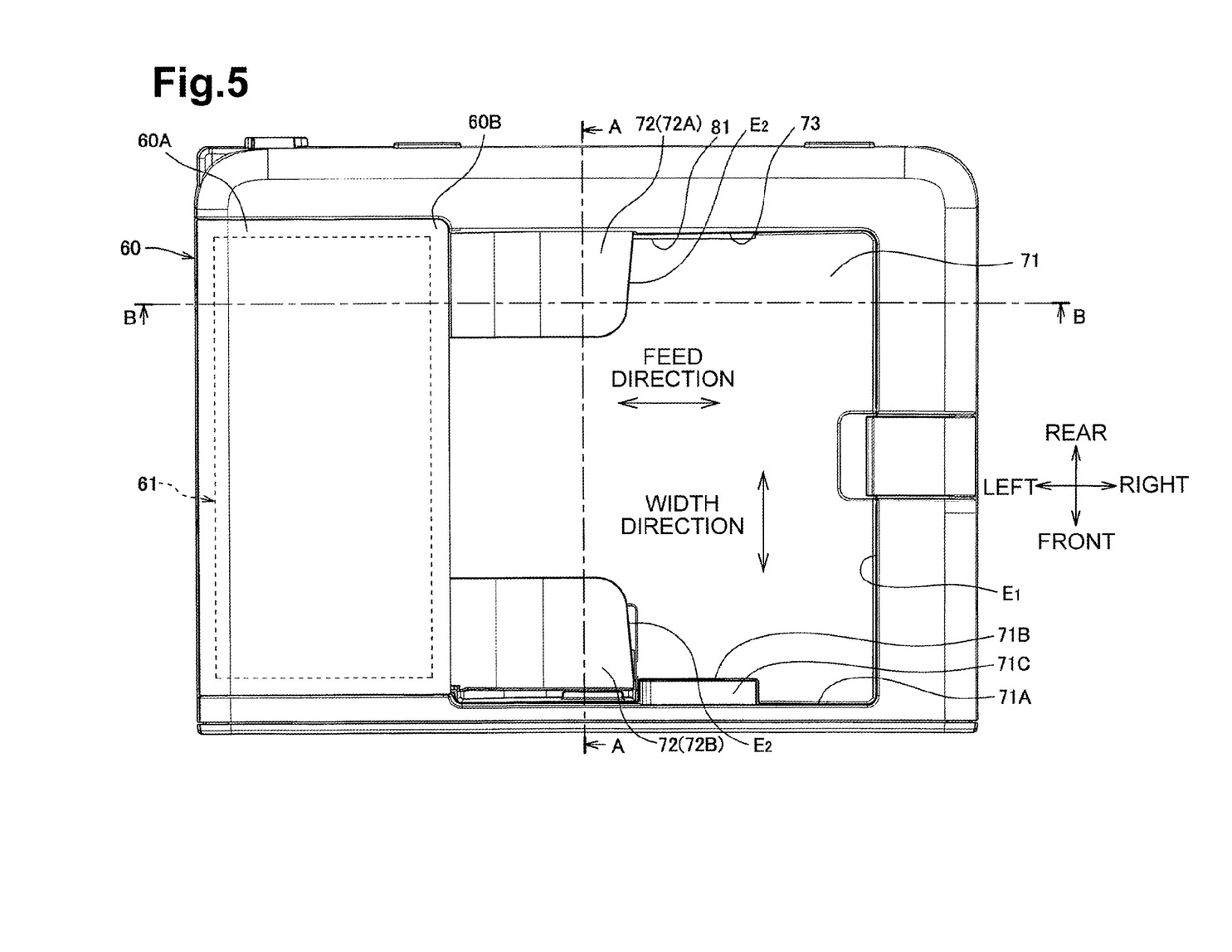
FIG. 5 is a top view of the mage reading apparatus according to the embodiment of the disclosure.

As shown in FIG. 5, the second tray 72 has a first tray portion 72A and a second tray portion 72B. The first tray portion 72A is disposed on one end in a width direction. The second tray portion 72B is spaced apart from the first tray portion 72A and disposed on the other end in the width direction.

In other words, there is a space between the first tray portion 72A and the second tray portion 72B. Thus, a central portion of the first tray 71 in the width direction is not covered by the second tray 72 on a side close to the feeding portion 61. In the following description, the second tray 72 refers to the first tray portion 72A and the second tray portion 72B collectively unless otherwise specified.

The width direction corresponds to a direction perpendicular to both the feed direction and a thickness of a sheet supported in the first tray 71. In the embodiment, the width direction corresponds to a front-rear direction of the document table 3. In the embodiment, one end of an object in the width direction refers to a rear end portion of the object and the other end of the object in the width direction refers to a front end portion of the object.

As shown in FIG. 4, a dimension L2 of a portion, parallel to the feed direction, of the second tray 72 is less than a dimension L1 of a portion, parallel to the feed direction, of the first tray 71.

The first tray 71 has a first end E1 on a side far from the feeding portion 61, and the second tray 72 has a second end E2 on the side far from the feeding portion 61. The second end E2 is disposed closer to the feeding portion 61 than the first end E1.

Figure 6:
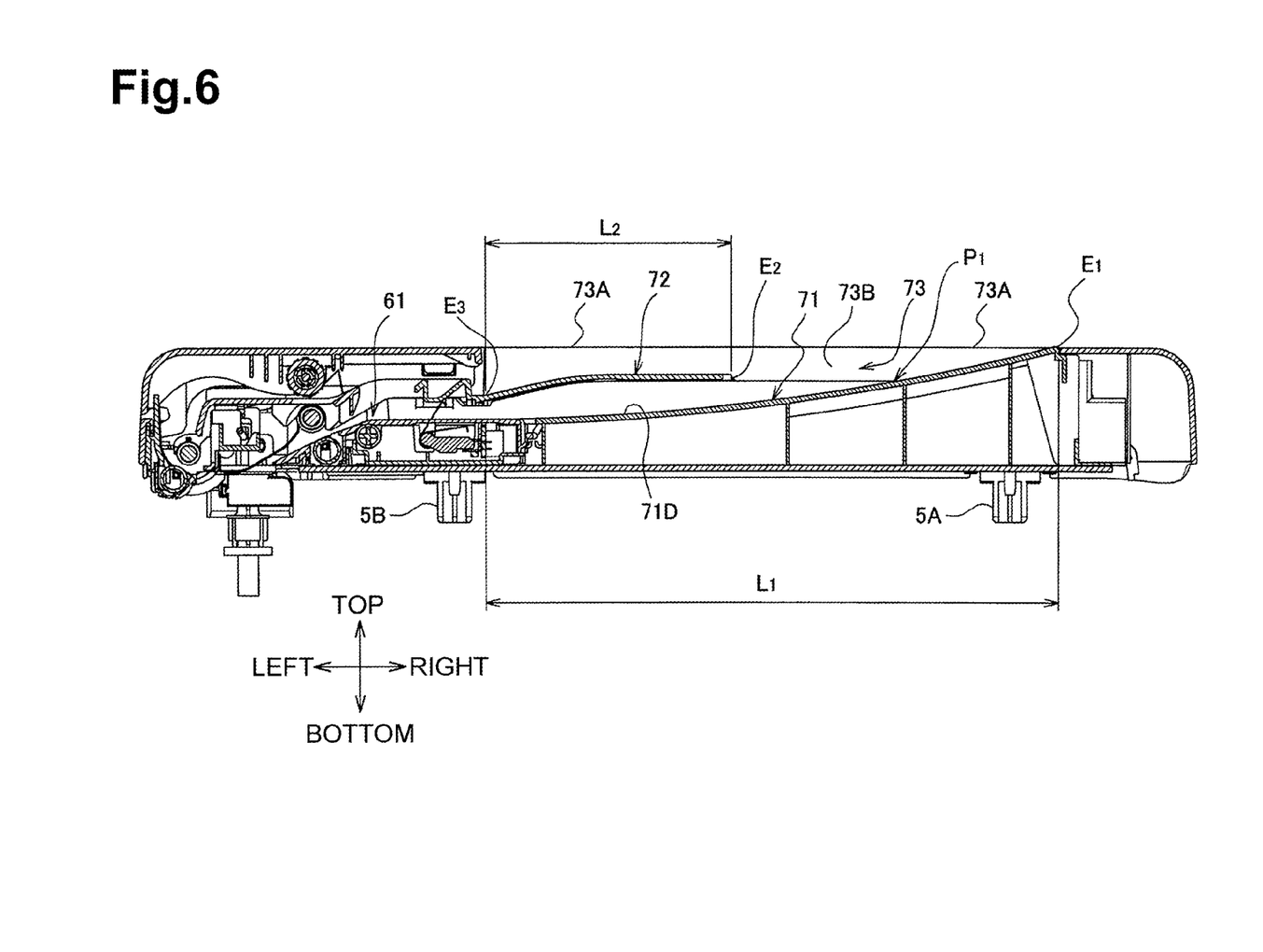
FIG. 6 is a sectional view of the image reading apparatus taken along the arrowed line B-B of FIG. 5.

As shown in FIG. 6, the first tray 71 smoothly continues from the inlet of the feeding portion 61 to the first end E1, and inclines upwardly toward the first end E1. The first end E1 is higher than the second end E2. The second tray 72 smoothly continues from the inlet of the feeding portion 61 to the second end E2 and inclines upwardly toward the second end E2.

As shown in FIG. 4, a first wall portion 73 is disposed on one end of the second tray 72 in the width direction. The first wall portion 73 is fixed relative to the first tray 71 and has a wall surface 73B. An upper end 73A of the wall surface 73B is higher than the second tray 72.

Figure 8:
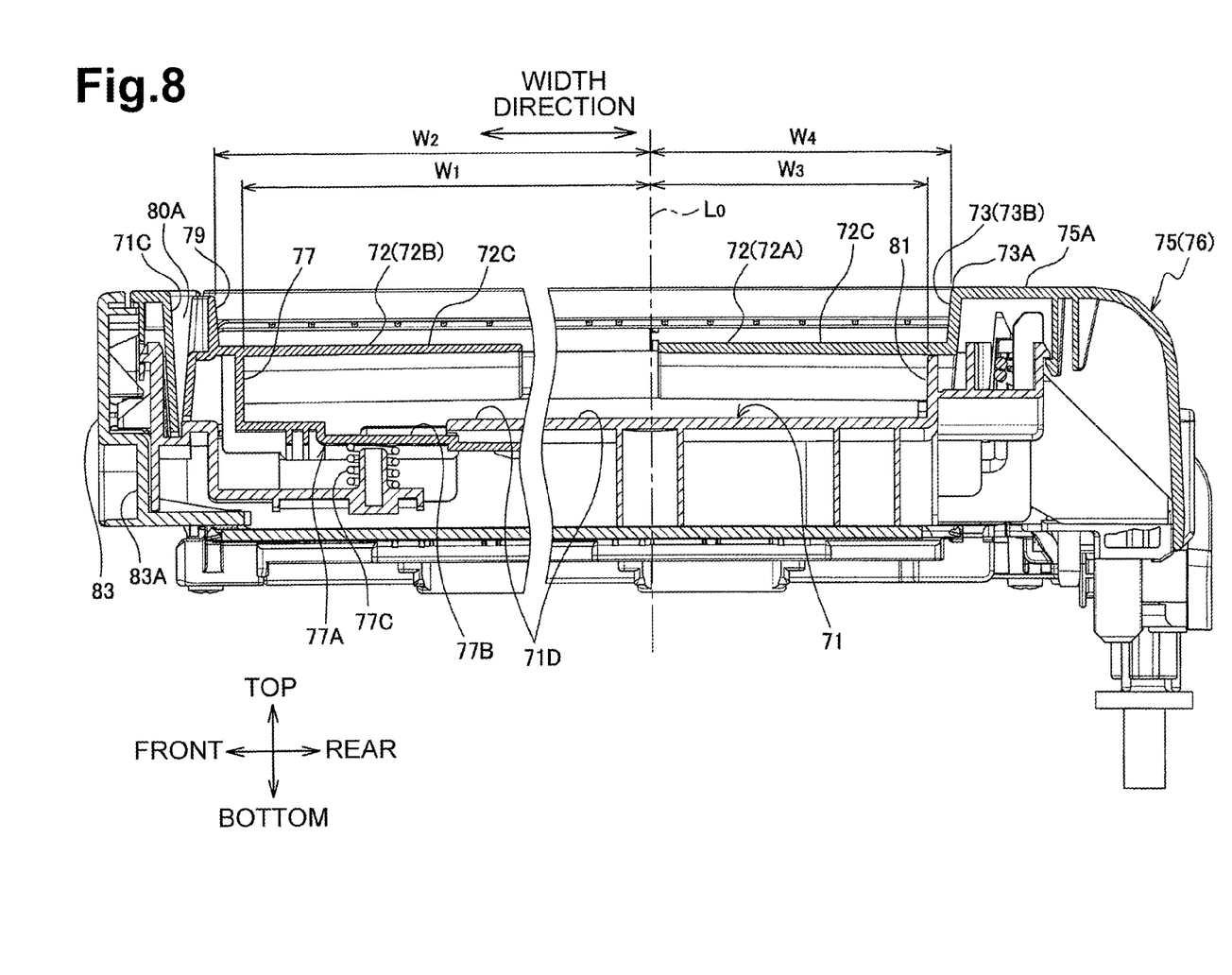
FIG. 8 is a sectional view of the image reading apparatus taken along the arrowed line A-A of FIG. 5.

As shown in FIG. 8, the wall surface 73B is substantially parallel to a direction perpendicular to receiving surfaces 72C of the second tray 72 or substantially parallel to a vertical direction. The first tray portion 72A of the second tray 72 and the first wall portion 73 are integrally formed or molded of resin.

Figure 9:
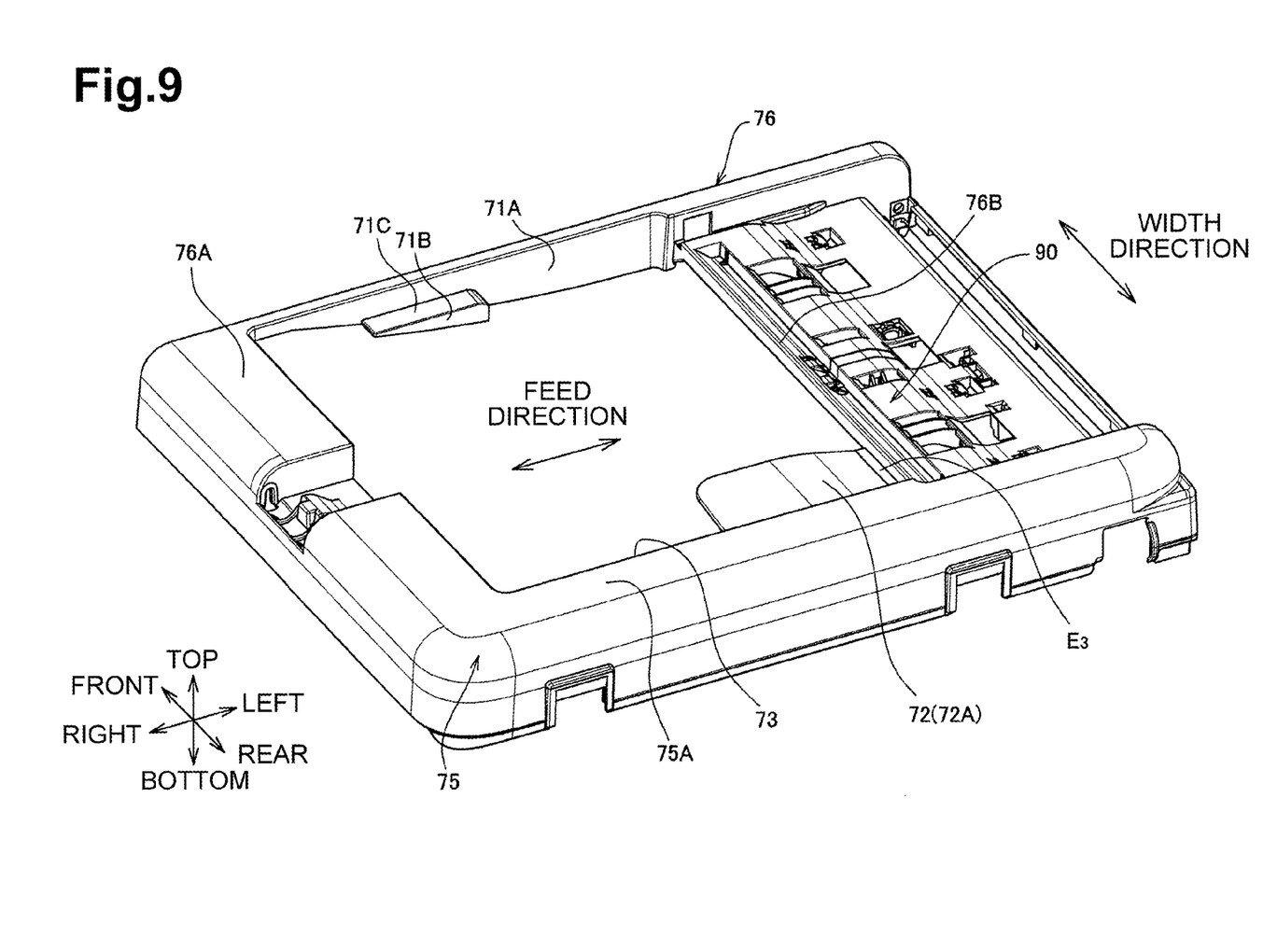
FIG. 9 is a perspective view of a covering member.

As shown in FIG. 9, the first tray portion 72A of the second tray 72 has a third end E3 at which the first tray portion 72A is integrally formed or molded with a feed chute 90 made of resin. The feed chute 90, the first tray portion 72A, the first wall portion 73, and an upper surface cover 75 are integrally formed or molded of resin.

The third end E3 refers to as an end of the second tray 72 closer to the feeding portion 61. The feed chute 90 is a component defining at least a part of a sheet feed path from the second tray 72 to the feeding portion 61. Hereinafter, the feed chute 90, first tray portion 72A and other components, which are integrally formed or molded of resin, are collectively called as a covering member 76 as an example of a frame member.

As shown in FIG. 6, the wall surface 73B of the first wall portion 73 is flat and extends from near the second end E2 to the first end E1. The wall surface 73B extends from a side closer to the third end E3 at least to a first position P1.

The first position P1 refers to a portion of the first tray 71, which is level with the second end E2. The wall surface 73B extends beyond the first position P1 to the first end E1.

As shown in FIG. 4, the upper end 73A of the first wall portion 73 connects to an upper end face 75A of an upper surface cover 75. The upper end face 75A is substantially perpendicular to the wall surface 73B. The upper end face 75A is level with a covering surface 60B of a cover 60A. The cover 60A is configured to cover an upper portion of the feeding potion 61. In other words, the covering surface 60B is flush with the upper surface cover 75.

Figure 7:
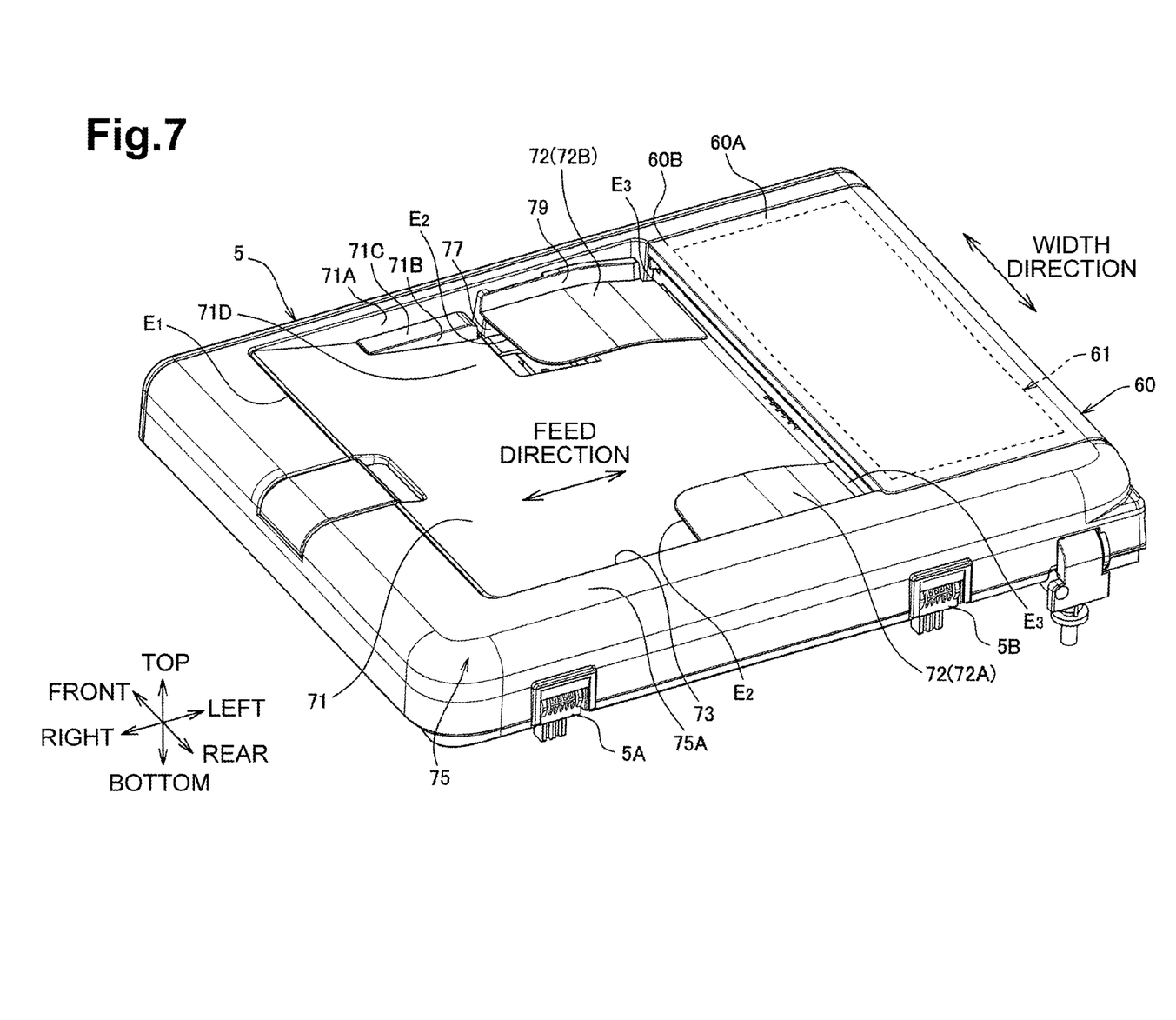
FIG. 7 is an external perspective view of the image reading apparatus according to the embodiment of the disclosure.

As shown in FIG. 7, a first guide portion 77 is disposed on the other end of the first tray 71 in the width direction, that is, on a front side of the first tray 71. The first guide portion 77 is movable in the width direction with respect to the first tray 71 and configured to prevent skewing of a sheet by contacting the other end of the sheet to be supported in the first tray 71 in the width direction.

As shown in FIG. 8, the second tray portion 72B and a second guide portion 79 are disposed on top of the first guide portion 77. The second guide portion 79 is configured to prevent skewing of a sheet by contacting the other end of the sheet to be supported in the second tray 72 in the width direction. An upper end of the second guide portion 79 is substantially flush with the upper end 73A.

The first guide portion 77, the second tray portion 72B, and the second guide portion 79 are integrally formed or molded. The second tray portion 72B and the second guide portion 79 are configured to move together with the first guide portion 77. In the embodiment, the first guide portion 77, the second tray portion 72B, and the second guide portion 79 are integrally formed or molded of resin.

There is a space 80A between the second guide portion 79 and a panel 83. A user can put his or her fingers in the space 80A to move the second tray portion 72B. In other words, a wall portion defining the second guide portion 79 can function as a handle for moving the second tray portion 72B.

The first guide portion 77 is provided with a facing portion 77A positioned to a supporting surface 71D of the first tray 71 or to the lower end of the first guide portion 77. The facing portion 77A is disposed facing the second tray portion 72B and at least a part of the facing portion 77A is positioned below the supporting surface 71D.

Figure 10:
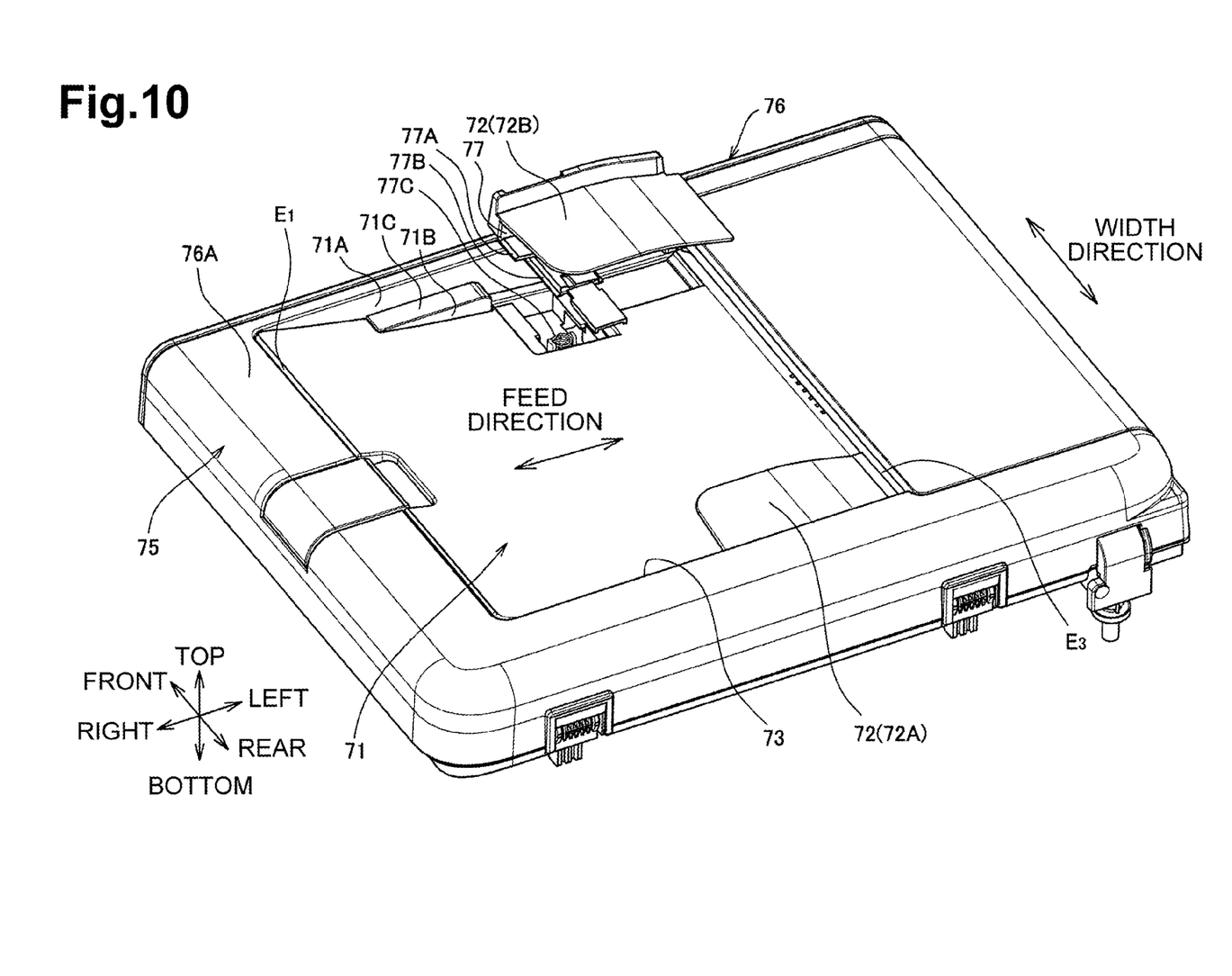
FIG. 10 illustrates that a first guide portion and other relevant portions are removed from the image reading apparatus shown in FIG. 7.

As shown in FIG. 10, the facing portion 77A is a flat plate extending from the lower end of the first guide portion 77 toward the first wall portion 73. As shown in FIG. 8, the second tray portion 72B, the first guide portion 77 and the facing portion 77A are disposed in a C shape in cross section perpendicular to the sheet feed direction.

The facing portion 77A is provided with a slide-contact portion 77B. The slide-contact portion 77B is configured to slidingly contact the first tray 71. The facing portion 77A and the slide-contact portion 77B are integrally formed or molded of resin with the first guide portion 77. The facing portion 77A and the slide-contact portion 77B integrally move with the first guide portion 77 in the width direction.

A pressing portion 77C is configured to press the slide-contact portion 77B to the first tray 71. The pressing portion 77C is disposed on an opposite side of the facing portion 77A to the supporting surface 71D or below the facing portion 77A. The pressing portion 77C is elastically deformable. In the embodiment, the pressing portion 77C is a coil spring.

The second guide portion 79 is located outward from the first guide portion 77 in the width direction. In other words, the first guide portion 77 disposed in the first tray 71 as the document tray is located closer to a center in the width direction than the second guide portion 79 of the second tray 72 as the ejection tray. A dimension W2 from the center in the width direction to the second guide portion 79 is greater than a dimension W1 from the center in the width direction to the first guide portion 77.

As shown in FIG. 4, a third guide portion 81 is disposed on one end of the first tray 71 in the width direction, e.g., on a same side as the first wall portion 73. The third guide portion 81 is fixed relative to the first tray 71. The third guide portion 81 is a wall substantially parallel to a direction perpendicular to the supporting surface 71D of the first tray 71 or parallel to the vertical direction. The third guide portion 81 is configured to prevent skewing of a sheet by contacting one end of the sheet to be supported in the first tray 71 in the width direction.

The third guide portion 81 extends at least beyond the second end E2 toward the first end E1 along a direction parallel to the feed direction of a sheet to be supported in the first tray 71. In the embodiment, the third guide portion 81 also extends toward a side closer to the feeding portion 61 than the second end E2.

The third guide portion 81 extends from the inlet of the feeding portion 61 beyond the second end E2 toward the first end E1. Third guide portion 81 is integrally formed or molded of resin with the first tray 71.

The third guide portion 81 is disposed on a side closer to a center in the width direction than the first wall portion 73. As shown in FIG. 8, the first wall portion 73 is located outward from the third guide portion 81 in the width direction. In other words, the third guide portion 81 of the first tray 71 as the document tray is located closer to the center in the width direction than the first wall portion 73 of the second tray 72 as the ejection tray.

A dimension W4 from the center in the width direction to the first wall portion 73 is greater than a dimension W3 from the center in the width direction to the third guide portion 81. Thus, in the embodiment, a width dimension of the second tray 72 as the ejection tray, (which is equivalent to the total of the dimension W2 and the dimension W4) is greater than a width dimension of the first tray 71 as the document tray, (which is equivalent to the total of the dimension W1 and the dimension W3).

The wall surface 73B of the first wall portion 73 and the receiving surface 72C of the second tray 72 continue without any space. Meaning of "continue without any space" includes a case where there is such a slight space that a sheet cannot be caught in, in addition to a case where there is no space literally.

As shown in FIG. 7, a second wall portion 71A is disposed at an end of the first tray 71, which is on the same side as the first guide portion 77 or the second tray portion 72B. The second wall portion 71A includes a fourth guide portion 71B. The fourth guide portion 71B is disposed at a position shifted in the feed direction from the first guide portion 77 toward the first end E1 and closer to the center in the width direction than the second wall portion 71A.

The fourth guide portion 71B is an end face of a protruding portion 71C protruding from the second wall portion 71A toward the center in the width direction, and parallel to the third guide portion 81. The first wall portion 73, the first guide portion 77, the second guide portion 79, the third guide portion 81 and the fourth guide portion 71B are parallel to each other. The protruding portion 71C is lower than the second end E2. The first guide portion 77 and the second guide portion 79 are configured to move in the width direction together with the second tray portion 72B while maintaining the parallel relationship.

As shown in FIG. 9, the protruding portion 71C and the second wall portion 71A are integrally formed or molded of resin with the upper surface cover 75 or the covering member 76. The first wall portion 73 and the second wall portion 71A are coupled to each other via a first coupling portion 76A and a second coupling portion 76B.

As shown in FIG. 10, the first coupling portion 76A couples the first wall portion 73 and the second wall portion 71A to the first end E1. As shown in FIG. 9, the second coupling portion 76B couples the first wall portion 73 and the second wall portion 71A to the feeding portion 61 or the third end E3.

The first wall portion 73, the second wall portion 71A, the first coupling portion 76A and the second coupling portion 76B are integrally formed or molded of resin and shaped like a rectangle frame having an opening in which the first tray 71 is to be positioned. The first coupling portion 76A is a beam-like member having an L-shape in cross section perpendicular to the width direction. The second coupling portion 76B is a plate-like member, and defines a part of the feed chute 90. In the embodiment, the covering member 76 and the feed chute 90 are integrally formed or molded of resin.

As shown in FIG. 8, the panel 83 is located outward from the second wall portion 71A in the width direction. As shown in FIG. 1, the panel 83 is a resin strip member, which is attached to the front face of the document cover 5.

The panel 83 is provided with a grip portion 83A in a central portion of the length. The grip portion 83A is recessed rearward to be gripped by the user when the user opens the document cover 5 upward.

In the embodiment, at least a part of the second tray 72 disposed above the first tray 71 is integrally formed or molded with the first wall portion 73. Thus, this structure provides adequate rigidity in the second tray 72.

In the embodiment, at least a portion of the upper end 73A of the first wall portion 73, which is integrally formed or molded with at least a portion, i.e., the first tray portion 72A, of the second tray 72 is higher than the first tray portion 72A of the second tray 72.

Thus, the first wall portion 73 functions as a guide member to prevent skewing of a sheet supported in the second tray 72.

In the embodiment, the feed chute 90 is integrally formed or molded with at least a portion, i.e., the first tray portion 72A, of the second tray 72.

Thus, the at least a portion of the second tray 72 is integrally formed or molded with the feed chute 90 and the first wall portion 73. This structure provides greater rigidity in the second tray 72.

In the embodiment, the second wall portion 71A is integrally formed or molded of resin with the first tray portion 72A of the second tray 72 and the first wall portion 73.

Thus, at the assembly operation, the first tray portion 72A of the second tray 72, the first wall portion 73, and the second wall portion 71 can be assembled at one time as they are combined into one component. This leads to reduction in steps of assembly processes and the number of parts.

In the embodiment, the first wall portion 73, the second wall portion 71A, the first coupling portion 76A and the second coupling portion 76B are integrally formed or molded of resin.

Thus, as shown in FIG. 9, one component including the first tray portion 72A of the second tray 72, the first wall portion 73, the second wall portion 71A, the first coupling portion 76A and the second coupling portion 76B, i.e., the covering member 76, is shaped like a frame. This structure further improves stiffness of the first tray portion 72A of the second tray 72.

In the embodiment, the panel 83 is located outward in the width direction from the second wall portion 71A.

The panel 83 and the covering member 76 are separate items. Thus, the panel 83 can be painted or decorated differently from the covering member 76, offering degrees of freedom in the design of the image reading apparatus 1.

In the embodiment, the second tray 72 includes the first tray portion 72A and the second tray portion 72B, which is disposed on the other end in the width direction and spaced apart from the first tray portion 72A.

Thus, the central portion of the first tray 71 in the width direction is not covered by the second tray 72. The user can visually check whether a sheet is supported in the first tray 71 with relative ease.

In the embodiment, the first guide portion 77 is integrally formed or molded with the second tray portion 72B such that the first guide portion 77 is located below the second tray portion 72B. Thus, different sized sheets can be fed.

In the embodiment, at least a part of the facing portion 77A is positioned below the supporting surface 71D.

This structure prevents sheets supported in the first tray 71 from contacting the facing portion 77A.

In the embodiment, the slide-contact portion 77B is configured to slidingly contact the first tray 71, and the pressing portion 77C is configured to press the slide-contact portion 77B to the first tray 71.

This structure increases frictional resistance to be generated at the slide-contact portion 77B. Thus, excessive movement of the first guide portion 77 can be prevented.

In the embodiment, the upper end 73A of the first wall portion 73 is higher than the second tray 72 and extends from near the second end E2 to the first end E1. This structure can cause the first wall portion 73 to function as a guide member configured to prevent skewing of a sheet supported in the second tray 72.

In the embodiment, the first tray 71 inclines upwardly toward the first end E1. The first wall portion 73 extends at least from the second end E2 to the first position P1.

With this structure, the user can place sheets easily on the first tray 71, which is used as the document tray in the embodiment. Even when the first tray 71 is used as an ejection tray, the user can remove ejected sheets easily.

Generally, sheets ejected from the feeding portion 61 may be greatly skewed compared with the sheets fed to the feeding portion 61.

In the embodiment, the second guide portion 79 provided on the second tray 72 as the ejection tray is located, in the width direction, outward from the first guide portion 77 disposed in the first tray 71 as the document tray.

With this structure, even when a sheet ejected from the feeding portion 61 is greatly skewed, the sheet contacts the second guide portion 79 such that the sheet is not improperly fed, and thus the skew of the sheet can be prevented.

In the embodiment, the fourth guide portion 71B is disposed at the position shifted in the feed direction from the first guide portion 77 toward the first end E1 and protrudes toward the center in the width direction from the second wall portion 71A on the same side of the first tray 71 as the first guide portion 77.

Thus, the first guide portion 77 and the fourth guide portion 71B operate together to prevent skew of a sheet. This structure can prevent the skew of a sheet even when the first guide portion 77 is shorter in the feed direction than the sheet.

In the embodiment, the third guide portion 81 is fixed relative to the first tray 71 and disposed closer to the center in the width direction than the first wall portion 73.

Thus, the third guide portion 81 can prevent a skew of a sheet to be supported in the first tray 71. In addition, as the sheet contacts the first wall portion 73, improper sheet feeding can be reliably prevented.

In the embodiment, the third guide portion 81 extends at least beyond the second end E2 toward the first end E1 along the direction parallel to the feed direction of a sheet to be supported in the first tray 71.

This structure can reliably cause the sheet supported in the first tray 71 to contact the first wall portion 73 to prevent improper sheet feeding.

In the embodiment, the wall surface 73B of the first wall portion 73 and the receiving surface 72C of the second tray 72 continue without any space. Thus, improper sheet feeding can be reliably prevented.

In the embodiment, the wall surface 73B of the first wall portion 73 is flat and extends from near the second end E2 toward the first end E 1. This structure can reliably prevent skewing of a sheet supported in the second tray 72.

In the embodiment, the covering surface 60B of the cover 60A covering the upper portion of the feeding portion 61 is level with the upper end face 75A connecting to the upper end of the first wall portion 73.

Thus, the covering surface 60B is flush with the upper end face 75A. In other words, an upper surface of the sheet feeding apparatus is flat. Furthermore, the need to increase the vertical dimension of the sheet feeding apparatus can be obviated.

The embodiment shows, but is not limited to that sheets are fed from the first tray 71 to the second tray 72. Sheets may be fed from the second tray 72 to the first tray 71.

The embodiment shows, but is not limited to that the first wall portion 73 extends to the first end E1. It may be sufficient that the first wall portion 73 extends at least from the second end E2 to the first position P1.

The embodiment shows, but is not limited to that the first tray portion 72A of the second tray 72 and the feed chute 90 are integrally formed or molded. The first tray portion 72A and the feed chute 90 may be individually provided.

The embodiment shows, but is not limited to that the entire upper end 73A of the first wall portion 73 is higher than the second tray 72. The entire upper end 73A may be level with the second tray 72 or the upper end 73A may have a location higher than the second tray 72 where the first wall portion 73 is integrally formed or molded with the first tray portion 72A of the second tray 72.

The embodiment shows, but is not limited to that the first guide portion 77 is integrally formed or molded with the second tray 72. The first guide portion 77 may be omitted and the fourth guide portion 71B may be configured to guide sheets being fed.

The embodiment shows, but is not limited to that the covering member 76 including the first tray portion 72A of the second tray 72, the first wall portion 73, and the second wall portion 71A is shaped like a frame.

The embodiment shows, but is not limited to that the panel 83 is located outward in the width direction from the second wall portion 71A. The covering member 76 may include a portion equivalent to the panel 83.

When the covering member 76 includes a portion equivalent to the panel 83, it may be difficult to make the equivalent portion flat. This is because a molded part should be designed with a draft on its sides to facilitate removal from mold.

The embodiment shows, but is not limited to that the second guide portion 79 is located outward in the width direction from the first guide portion 77. The first guide portion 77 and the second guide portion 79 may be located at the same position in the width direction. It is preferable that the first guide portion 77 be located outward in the width direction from the second guide portion 79 especially when sheets are fed from the second tray 72 to the first tray 71.

The embodiment shows, but is not limited to that the fourth guide portion 71B is provided. The fourth guide portion 71B may be omitted and the first guide portion 77 may extend toward the first end E 1.

The embodiment shows, but is not limited to that the third guide portion 81 fixed relative to the first tray 71 is disposed closer to the center in the width direction than the first wall portion 73.

The third guide portion 81 may be omitted and the first wall portion 73 may be used as the third guide portion 81. In other words, the width dimension of the second tray 72 (equivalent to the total of the dimensions W2 and W4) may be set as the same dimension as the first tray 71 (equivalent to the total of the dimensions W1 and W3).

The embodiment shows, but is not limited to that the third guide portion 81 extends from the inlet of the feeding portion 61 beyond the second end E2 toward the first end E1. The third guide portion 81 may extend at least beyond the second end E2 toward the first end E1.

The embodiment shows, but is not limited to that the wall surface 73B of the first wall portion 73 and the receiving surface 72C of the second tray 72 continue without any space therebetween.

The embodiment shows, but is not limited to that the second tray 72 includes the first tray portion 72A and the second tray portion 72B. The second tray 72 may be configured without any space in the central portion in the width direction.

The embodiment shows, but is not limited to that the wall surface 73B of the first wall portion 73 is flat and extends from near the second E2 to the first end E1. The wall surface 73B may be a curved surface such that the width of the first tray 71 increases toward the first end E1.

The embodiment shows, but is not limited to that the covering surface 60B is level with the upper end face 75A continuing to the upper end 73A of the first wall portion 73. There may be a level difference between the covering surface 60B and the upper end face 75A.

The embodiment shows, but is not limited to that the image forming portion 50 is of electrophographic type. The image forming portion may be of inkjet type.

The embodiment shows, but is not limited to the image forming apparatus 100 including the image reading apparatus 1 and the image forming portion 50. The disclosure can apply to the image reading apparatus only.

The embodiment shows, but is not limited to that the disclosure applies to the automatic document feeder used in the image reading apparatus 1. The disclosure can apply to a sheet feeding device configured to feed a sheet to the image forming portion 50.

While the features herein have been described in connection with various example structures and illustrative aspects, it will be understood by those skilled in the art that other variations and modifications of the structures and aspects described above may be made without departing from the scope of the inventions described herein. Other structures and aspects will be apparent to those skilled in the art from a consideration of the specification or practice of the features disclosed herein. It is intended that the specification and the described examples only are illustrative with the true scope of the inventions being defined by the following claims.

What is claimed is:

1. A sheet feeding apparatus comprising:
    a main tray configured to support a stack of sheets;
    a frame member including:
        a first wall portion fixed relative to the main tray and facing in a width direction; and
        a first sub tray portion disposed above a part of the main tray and below an upper end of the first wall portion and fixed relative to the main tray such that the first sub tray portion protrudes inward in the width direction from the first wall portion, the first sub tray portion being configured to support a stack of sheets; and
    a feeder configured to feed a sheet supported in the main tray to the first sub tray portion in a feed direction perpendicular to the width direction,
    wherein the main tray has a first end on a side far from the feeder,
    wherein the first sub tray portion has a second end on the side far from the feeder and a third end on a side near the feeder,
    wherein the second end of the first sub tray portion is located closer to the feeder than the first end of the main tray, and
    wherein the first wall portion extends from the third end of the first sub tray portion toward the first end of the main tray.

2. The sheet feeding apparatus according to claim 1, wherein the frame member further includes a feed chute defining at least a part of a feed path extending from the first sub tray portion to the feeder, the feed chute being coupled to the third end of the first sub tray portion.

3. The sheet feeding apparatus according to claim 1, wherein the frame member further includes a second wall portion disposed facing the first wall portion in the width direction.

4. The sheet feeding apparatus according to claim 3, wherein the frame member further includes:
    a first coupling portion disposed to the first end of the main tray and coupling the first wall portion and the second wall portion; and
    a second coupling portion disposed to the feeder and coupling the first wall portion and the second wall portion.

5. The sheet feeding apparatus according to claim 3, further comprising a panel located outward in the width direction from the second wall portion.

6. The sheet feeding apparatus according to claim 1, further comprising a second sub tray portion disposed above the part of the main tray and spaced apart from the first sub tray portion in the width direction, the second sub tray portion being configured to move in the width direction relative to the first sub tray portion,
    wherein the first sub tray portion and the second sub tray portion constitute a second sub tray.

7. The sheet feeding apparatus according to claim 6, further comprising a guide portion disposed below the second sub tray portion, the guide portion being configured to prevent skewing of a sheet supported on the main tray by contacting an end of the sheet in the width direction and to move together with the second sub tray portion.

8. The sheet feeding apparatus according to claim 7, wherein the guide portion is integrally formed with the second sub tray portion.

9. The sheet feeding apparatus according to claim 7, further comprising a facing portion disposed to a supporting surface of the main tray and facing the second sub tray portion of the second sub tray, and at least a portion of the facing portion is below the supporting surface.

10. The sheet feeding apparatus according to claim 9, further comprising:
    a slide-contact portion disposed in the facing portion and configured to slidingly contact the main tray, and
    a pressing portion configured to press the slide-contact portion to the main tray.

11. The sheet feeding apparatus according to claim 1, further comprising an image sensor configured to read an image of the sheet, wherein the feeder is configured to feed the sheet to the image sensor.

12. A sheet feeding apparatus comprising:
a main tray configured to support a stack of sheets;
a frame member including:
- a first wall portion fixed relative to the main tray and facing in a width direction; and
- a first sub tray portion disposed above a part of the main tray and below an upper end of the first wall portion and fixed relative to the main tray such that the first sub tray portion protrudes inward in the width direction from the first wall portion, the first sub tray portion being configured to support a stack of sheets; and a feeder configured to feed a sheet between the main tray and the first sub tray portion in a feed direction perpendicular to the width direction, wherein the main tray has a first end on a side far from the feeder,
wherein the first sub tray portion has a second end on the side far from the feeder and a third end on a side near the feeder,
wherein the second end of the first sub tray portion is located closer to the feeder than the first end of the main tray, and
wherein the first wall portion extends from the third end of the first sub tray portion toward the first end of the main tray.

13. The sheet feeding apparatus according to claim 12, wherein the frame member further includes a feed chute defining at least a part of a feed path extending from the first sub tray portion to the feeder, the feed chute being coupled to the third end of the first sub tray portion.

14. The sheet feeding apparatus according to claim 12, wherein the frame member further includes a second wall portion disposed facing the first wall portion in the width direction.

15. The sheet feeding apparatus according to claim 12, further comprising a second sub tray portion disposed above the part of the main tray and spaced apart from the first sub tray portion in the width direction, the second sub tray portion being configured to move in the width direction relative to the first sub tray portion,
wherein the first sub tray portion and the second sub tray portion constitute a second sub tray.

16. The sheet feeding apparatus according to claim 12, further comprising an image sensor configured to read an image of the sheet,
wherein the feeder is configured to feed the sheet to the image sensor.

* * * * *